Patented Oct. 15, 1935

2,017,672

UNITED STATES PATENT OFFICE 2,017,672

METHOD OF PRODUCING CHEMICALLY PURE 4,4'-DI-(1-PHENYL-3-METHYL-PYRAZOLONYL)

Iwan I. Ostromislensky, New York, N. Y., assignor to Medico Chemical Corporation of America, New York, N. Y.

No Drawing. Application July 5, 1934,
Serial No. 733,870

4 Claims. (Cl. 260—45)

My invention relates to methods of producing 4.4'-di-(1-phenyl-3-methyl-pyrazolonyl) in a chemically pure state and of a relatively low toxicity.

In my patent application Serial No. 717,723, filed Mar. 28, 1934, I fully explained the importance and value of the chemically pure 4.4'-di-(1-phenyl-3-methyl-pyrazolonyl), or di-phenylmethylpyrazolonyl as it will be hereinafter called for the sake of brevity, for the treatment of various diseases, especially for relieving withdrawal symptoms in morphine addicts. It is also valuable as an analgesic in various diseases, and as a specific for a number of allergic diseases.

As I disclosed in the above application, this substance may be obtained in a chemically pure state by subjecting phenyl hydrazine to the reaction with ethylacetoacetate under specific conditions. The most important of these conditions is the maintainance of the proper temperature of the reaction mixture as controlled by the temperature of the heating medium, also the length of time of the reaction.

I also disclosed in the above application that this reaction belongs to the class of exothermic reactions. It is also remarkable for the fact that this reaction passes in two stages, as it was mentioned by Knorr, the intermediate product formed being mono-molecular pyrazolon, i. e., 1-phenyl-3-methyl-5-pyrazolon, according to the formula:

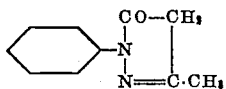

The formation of this substance is observed already at 100° C. (boiling water bath). A thorough study of this two-stage reaction has shown that the first stage passes without any marked development of heat. The second stage, however, consisting of the oxidation of phenylmethylpyrazolon by phenyl hydrazin, is accompanied by the development of a comparatively large amount of heat. It belongs therefore to exothermic reactions.

I have discovered that this reaction, when carried independently and under certain specific conditions, also results in the production of a chemically pure di-phenylmethylpyrazolonyl possessing a low toxicity.

These conditions I found to be the same as specified in my above application, the only difference being in the temperature of the reaction. My investigations have shown that during the oxidation of phenylmethylpyrazolon by phenyl hydrazine, temperature of the reaction mixture may vary between 190 and 255° C. This reaction, even at such a low temperature as 190° C., leads to the formation of a chemically pure di-phenylmethylpyrazolonyl possessing a low toxicity. It is understood, of course, that the temperature of the heating medium, such as an oil bath, must be maintained at a lower temperature, i. e., about 150° C.

*Example I.*—71 grams of 1-phenyl-3-methyl-5-pyrazolon are heated with 45 grams of phenyl hydrazine on the oil bath during 4 hours, the temperature of the bath being maintained at 150° C. At the expiration of about 40-60 minutes the temperature of the reaction mixture reaches 195° C., while the temperature of the oil bath is maintained all the time at 150° C.

To the reaction mixture thus formed, hot anhydrous methyl alcohol is added. The liquid is sucked off, and the crystals remaining on the funnel are thoroughly washed with hot anhydrous methyl alcohol, then pressed out and dried at 100° C. to a constant weight. The yield of the snow-white crystals varies between 56 and 60 grams.

I claim as my invention:

1. A step in the process of producing di-phenylmethylpyrazolonyl, in a pure state and of a comparatively low toxicity, consisting in heating a mixture of phenylmethylpyrazolon with phenylhydrazine, and regulating the temperature of the reaction mixture so that it shall reach 190° C. but shall not exceed 255° C.

2. A method of producing di-phenylmethylpyrazolonyl in a pure state and of a comparatively low toxicity, consisting in heating a mixture of phenylmethylpyrazolon with phenylhydrazine, regulating the temperature of the reaction mixture so that it will reach 190° C. but will not exceed 255° C., and continuing the heating for at least two hours after the temperature of the reaction mixture has reached 150° C.

3. A step in the process of producing di-phenylmethyl-pyrazolonyl in a pure state and of comparatively low toxicity, consisting in heating a mixture of phenyl-methyl-pyrazolon with phenylhydrazine partly by an external heating medium, partly using the exothermic heat of the reaction, and regulating the temperature of said external heating medium so as to maintain the temperature of the reaction mixture between 190° C. and 255° C.

4. A method of producing di-phenyl-methyl-pyrazolonyl in a pure state and of comparatively low toxicity, consisting in heating a mixture of phenylmethylpyrazolone with phenylhydrazine partly by the external application of heat, partly by using the exothermic heat of the reaction, continuing the heating for at least two hours after the temperature of the reaction mixture has reached 150° C., and regulating said external temperature so as to maintain the temperature of the reaction mixture between 190° C. and 255° C.

IWAN I. OSTROMISLENSKY.